United States Patent [19]

Ingenito et al.

[11] 3,839,204

[45] Oct. 1, 1974

[54] INTEGRAL BLOOD HEAT AND COMPONENT EXCHANGE DEVICE AND TWO FLOW PATH MEMBRANE BLOOD GAS EXCHANGER

[75] Inventors: Donald R. Ingenito, Scotia; Wilfred P. Mathewson, Schenectady; David M. Ryon, Albany; Gunnar E. Walmet, Schenectady, all of N.Y.

[73] Assignee: General Electric Company, Milwaukee, Wis.

[22] Filed: Apr. 27, 1972

[21] Appl. No.: 247,987

[52] U.S. Cl.................. 210/181, 23/258.5, 210/321
[51] Int. Cl........................................... B01d 13/00
[58] Field of Search ........... 210/321, 181; 23/258.5; 128/DIG. 3

[56] References Cited
UNITED STATES PATENTS

| | | | |
|---|---|---|---|
| 3,211,148 | 10/1965 | Galajda.............................. | 23/258.5 |
| 3,256,883 | 6/1966 | DeWall............................... | 23/258.5 |
| 3,332,746 | 7/1967 | Claff et al......................... | 210/321 X |
| 3,396,849 | 8/1968 | Land et al.......................... | 23/258.5 |
| 3,398,091 | 8/1968 | Greatorex......................... | 210/321 X |
| 3,413,095 | 11/1968 | Bramson........................... | 210/321 X |
| 3,484,211 | 12/1969 | Mon et al. ......................... | 23/258.5 |
| 3,490,523 | 1/1970 | Esmond............................ | 210/321 X |
| 3,520,803 | 7/1970 | Iaconelli .......................... | 210/321 X |
| 3,684,097 | 8/1972 | Mathewson et al................. | 210/321 |

*Primary Examiner*—Samih N. Zaharna
*Assistant Examiner*—Richard Barnes
*Attorney, Agent, or Firm*—James E. Espe; Granville M. Pine; Edward A. Hedman

[57] ABSTRACT

A device for oxygenating or dialyzing blood has elementary units comprising a heat exchanger close-coupled to a component exchanger comprising one or more frames having rectangular openings and a gas permeable membrane on each face. In the heat exchanger element, heat is transferred via conduction from a source or to a sink through a membrane to or from a flowing film of blood. Two confronting membranes define a thin passageway for blood in the component exchanger element and remote sides of the membranes confront a second passageway in which another fluid such as dialysate or oxygen enriched gas flows, the passageway containing an open support structure. The support structure distributes the gas uniformly and supports the membranes when the space between them is pressurized with blood. In preferred embodiments, there are provided two path thin film flows through the heat exchanger. In the gas exchanger, thermoplastically formed protuberances project integrally from the membranes into the blood space for precisely defining the blood film thickness. Also provided is a blood component exchanger including an open support structure shaped to provide two path thin film flows therethrough.

24 Claims, 12 Drawing Figures

INTEGRAL BLOOD HEAT AND COMPONENT EXCHANGE DEVICE AND TWO FLOW PATH MEMBRANE BLOOD GAS EXCHANGER

The present invention relates to devices for transferring heat and gaseous or other components through membranes into and out of fluids. More particularly, it is concerned with liquid-liquid or gas-liquid transfer devices, and such devices which incorporate an integral heat exchanger. These devices find utility as blood dialyzers, e.g., in artificial kidneys, and as blood oxygenators, e.g., in artificial lungs.

BACKGROUND OF THE INVENTION

The first generation of extracorporeal blood gas exchange devices, e.g., bubble and disc oxygenators, distributed a thin film of blood over a large area in the presence of an oxygen rich ambient. The blood thereby yielded some of its carbon dioxide and became partially saturated with oxygen. This process caused undue hemolysis, clotting, protein denaturation and had other damaging effects on the blood. Blood trauma thus became a limiting factor in long term perfusion with blood that had been subjected to extracorporeal oxygenation.

The current trend in blood gas exchange devices is toward use of a membrane which has blood on one side and oxygen enriched gas on the other, thus eliminating the undesirable blood-gas interface. Hence oxygenation involving a membrane results in less hemolysis of red blood cells and in less deformation and fracture of blood proteins. Protein damage is manifested by sludging and by fat aggregates or other emboli occurring in the blood vessels, sometimes with permanently injurious consequences.

Membrane-type blood gas diffusing devices developed up to this time exhibit reduced blood trauma and improved gas exchange efficiency compared with a film-type or bubble-type device. The prior art membrane-types usually comprise stacked membrane envelopes with blood running on one side of the membrane and gas on the other side. Two such devices are described in Lande, et al, U.S. Pat. No. 3,396,849, and by Bramson, et al, in J. Thorac. Cardiov. Surg. 50, 391 (1965). Separators with intricate channels are used to simulate capillary flow and supposedly to minimize the formation of rivulets or preferential flow paths which militate against blood in the device being efficiently in contact with the membrane surfaces. These prior devices have been unduly large for their gas exchange capacity. Their priming requirements are consequently high. The membranes used have been inclined to cohere at their interfaces during storage, requiring special treatment or an uncertain sacrifice of gas exchange area when put into use. The number of piece parts, the complexity and, hence, the number of manufacturing steps have been unduly high, leading to high cost and a severe economic disadvantage in the light of the device being intended for disposal after a single use. The ratio of blood holdup with respect to flow rate has been higher than desirable in past designs. Moreover, this holdup ratio has been observed to vary disadvantageously with change in flow rates and, in some cases, membranes have been known to puncture due to distension with increased blood pressures and due to high concentrated stresses that are developed on the intricate multiple point membrane separators or back-up members.

A new membrane fluid exchange device described in the copending application of two of the present applicants, Ser. No. 51,829, filed July 2, 1970, now U.S. Pat. No. 3,684,097 and incorporated herein by reference, overcomes these and other disadvantages. The basic construction and advantages of a similar membrane-oxygenator are also described in Claff, et al, U.S. Pat. No. 3,060,934.

The membrane device of the said copending application is characterized by thin plastic frames each having a gas permeable membrane adhered to one of its faces. The frames are stacked in pairs with their membrane covered surfaces confronting each other to form a blood envelope, having a thin, large area path for a blood film to flow between membranes. The blood remote sides of the envelopes are recessed in an amount slightly less than the thickness of each frame. The recess constitutes a gas flow path, which may be occupied by a thin, flat screen wrapped in a nonwoven fibrous material to assist in obtaining uniform gas distribution over the back of the membrane, while providing back-up for the fragile membranes in the stack and having properties which promote blood coagulation so as to seal off blood flow if a pinhole leak develops in the membrane.

The device of the copending application offers many advantages and has gained wide-spread acceptance, but it would still be desirable to reduce the total number of parts and lineal length of the critical seals. An integral heat exchange capacity is also desirable.

The present invention provides a simple, industrially manufacturable membrane blood component exchanger with optimized proportions, in the sense that it is just as efficient, but of simpler construction than can be achieved with prior art designs. Like the membrane device of the copending application, the membrane device embodiments according to the present invention have greater biocompatibility and offer advantages in both dialysis and open-heart procedures and in partial cardiopulmonary support. Unlike the membrane lung of the copending application, several embodiments of this invention provide integral heat exchange capacity. These are advantageous because almost all extracorporeal circulation procedures require heat transfer. For example, good surgical practice requires that the heat lost in the extracorporeal components be added back before the blood is returned to the body. Moreover, in an increasing number of cases, external heat exchange is used to help maintain the patient at a reduced temperature during surgical procedures.

All prior art devices can be — and often are — used with separate heat exchangers, but these tend to be crude, and nondisposable.

In one prior art approach, an integral heat exchanger and oxygenator is provided, in which the gas exchange is by simple bubbling through the blood and the heat exchange by conventional separation of the blood from liquid coolant streams by rigid metallic walls. In common with other bubble oxygenators this prior art device can cause blood trauma of the type mentioned above, and heat exchange is not efficient.

Another prior art approach is described by Bramson, et al, in the Journal of Thoracic and Cardiovascular Surgery article mentioned above. For use as a lung/heat exchanger, there are provided stacked silicone rubber membranes interleaved with open weave screens, and having pressurized water mattresses placed between each blood cell and its neighbor. Heat exchange capacity is provided by circulating the water in the mattresses. As has been mentioned above, such an assembly is unduly large, being in the shape of a drum, 24 inches in diameter, difficult to scale up, is not disposable, has a relatively high blood priming volume (300 ml. with only 4 cells) and is of complex construction.

It has been proposed to use the Lande, et al, membrane oxygenator-dialyzer, U.S. Pat. No. 3,396,849, as a heat exchanger, by using folded metal foils as the membrane. There is no suggestion that the device may be used with integral heat exchange and blood component transfer, however, and it would appear that two such devices are contemplated, one for heat exchange and the other for oxygenation-dialysis. In any event, such a device has been reported to have a relatively large scaling factor so that large units seem currently less practical, both for heat exchange and for use as oxygenators-dialyzers.

SUMMARY OF THE INVENTION

The device of the present invention is constructed primarily for use as an artificial lung, in which the carbon dioxide in the blood is supplanted with oxygen, or the device may be used as an artificial kidney, whereupon it dialyzes blood components. The description will focus on use of the device as an artificial lung for sake of brevity.

The new blood component transfer device is distinguished by its simplicity and gas or liquid exchange efficiency with low blood trauma. The integral heat exchanger embodiment provides the above-mentioned additional advantages. The integral device has elementary sub-assembly units comprising a heat exchanger close-coupled, up-stream, or downstream, (with frame stiffening, if necessary), with one or more blood component sub-assemblies, each of which comprises a frame having rectangular openings and a gas permeable membrane on each face. In the heat exchanger sub-assembly heat is transferred from a source or sink through a membrane into a flowing thin film of blood. In the blood component exchanger assembly, two confronting membranes define a thin passageway for blood and remote sides of one or more of the membranes confront a second passageway or passageways in which another fluid such as a dialysate or oxygen enriched gas flows, the passageway containing a three-dimensional open support structure. The open support structure distributes the fluid uniformly and lends support to the membranes when the space between them is pressurized with blood. In preferred embodiments, there are provided two-path thin film blood flows through the heat exchanger sub-assembly. In the blood component exchanger thermoplastically formed protuberances will project integrally from the membranes into the blood space for defining the flowing blood film or films. In preferred blood gas exchangers the open support members are shaped to provide two path thin film flow therethrough.

Objects of the new blood exchanger devices are to provide a simple but effective construction; to minimize the quantity of priming fluid required; to reduce the likelihood of catastrophic membrane failure; to minimize the size of the assembly; to make it disposable by virtue of its low cost; to control blood film thickness and to optimize gas diffusion; to minimize gas pressure drop; to eliminate preferential blood flow paths between membranes and from layer to layer; to minimize foreign surface areas that are in contact with blood; to eliminate sophisticated manifolding and sealing requirements, thereby reducing the probability of leaks; to seal off pinhole leaks, if any, in the membrane by clotting blood on a membrane far outside of the blood flow path; and to provide a heat exchanger for irregular surfaces with little contact resistance.

These objects and others apparent to those skilled in the art will be achieved according to the present invention as described in the illustrative embodiments taken in conjunction with the drawings.

DESCRIPTION OF THE PREFERRED EMBODIMENTS

Figure 1:
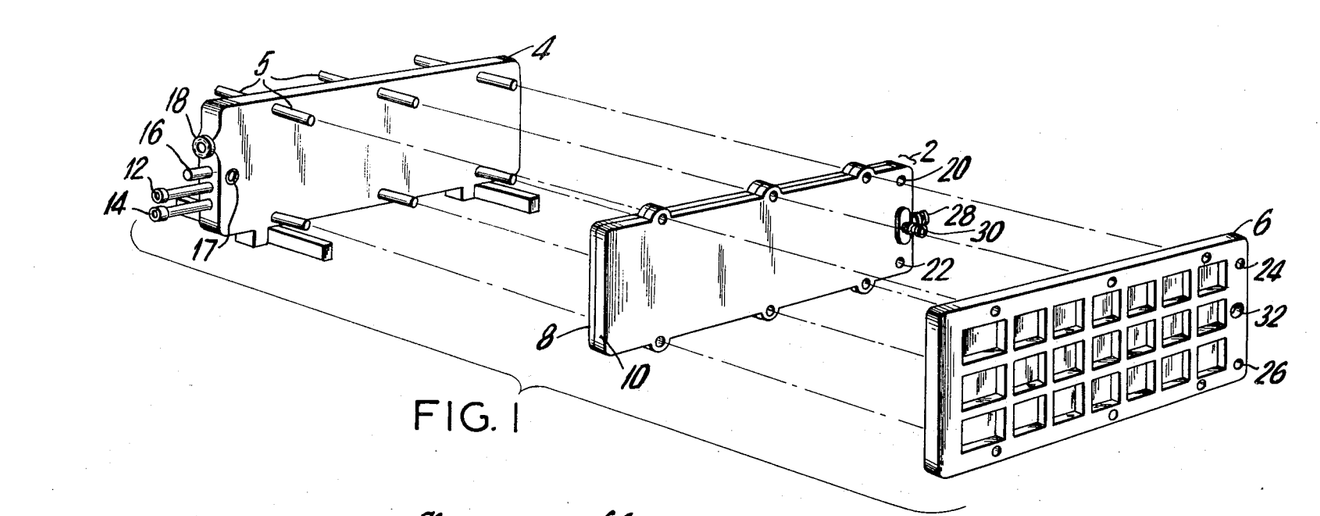
FIG. 1 is an exploded perspective view of a blood heat and gas exchange assembly, including a holder and cover plate therefor.

Referring to FIG. 1, there is shown an overall layout of the lung/heat exchanger assembly 2 including a typical holder 4 and cover plate 6. A disposable lung/heat exchanger assembly 2 of this invention comprises a heat exchanger sub-assembly 8 and a gas exchanger sub-assembly 10 and is normally used by sandwiching between the smooth, flat surfaces of holder 4 and cover plate 6. Cover plate 6 which may be made of metal or plastic and the like is shown ribbed for lightness and stiffness. Holder 4, including mounting studs 5, can accommodate a plurality of heat exchanger/lungs on one or both sides. For example a similar assembly 2 can be placed on the far side, but this is omitted from FIG. 1 for the sake of clarity.

For heat exchange, temperature control is provided by making holder 4 a heat source or heat sink. One convenient way to do this is to provide internal channels for the passage of a heat transfer fluid, although other means, such as electrical resistance heaters and refrigerating coils can be used. In the embodiment shown, holder 4 is made of metal and is cored for passage of heating and cooling water through water connection ports 12 and 14. After assembly, heat will flow in either direction through the wall of holder 4, through the confronting membrane on heat exchanger sub-assembly 8 and into or out of the blood film.

In the embodiment shown, after assembly, oxygen or an oxygen-containing gas will enter port 16 in holder 4 and flow through gas transfer hole and seal 17, through a correspondingly aligned hole in the frame of heat exchanger 8 and thence into an aperture in oxygen exchanger 10. If the gas inlet pressure is too high, means such as relief valve 18, can be provided to open and vent the gas before any possible damage to the lung can occur. The gas then flows in a pattern more clearly understood by reference to FIG. 3 through the gas exchange sub-assembly 10, picks up carbon dioxide and the like and vents to the atmosphere through gas exhaust ports 20 and 22 and corresponding holes 24 and 26 in cover plate 6.

Figure 4:
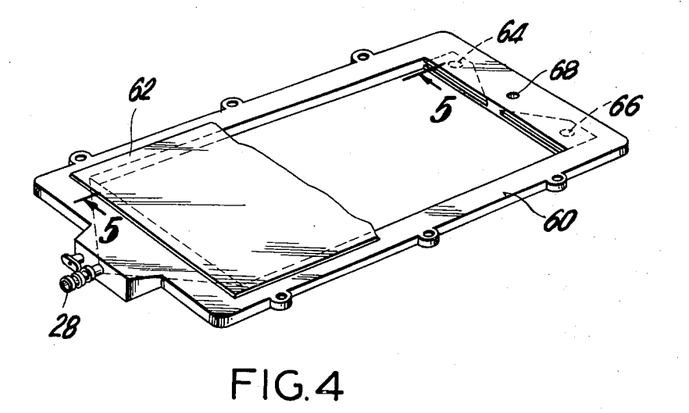
FIG. 4 is a perspective view showing one type of a heat exchanger sub-assembly according to this invention.
Figure 5:
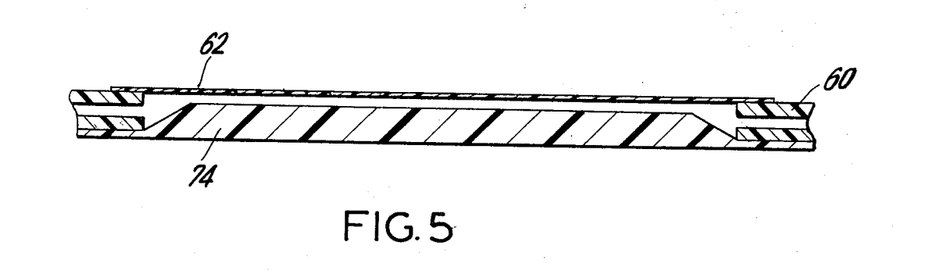
FIG. 5 is a vertical cross-sectional view taken on line 5—5 in FIG. 4 to show a solid bottom construction in the heat exchanger sub-assembly.
Figure 6:
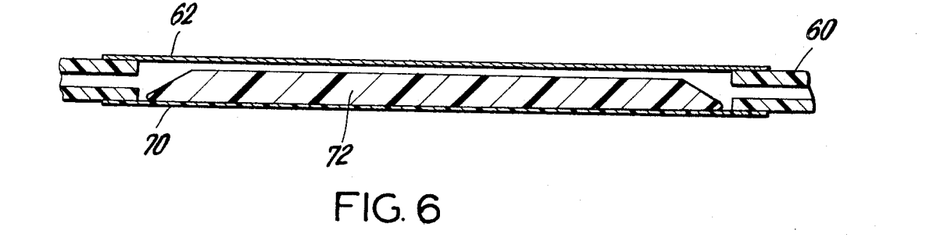
FIG. 6 is a vertical cross-sectional view of a heat exchanger sub-assembly (conforming to line 5—5 in FIG. 4), but differing in construction from that of FIG. 4 in having a membrane-floating sheet combination as the bottom closure.

Blood enters lung/heat exchanger assembly 2 through blood inlet fitting 28 in one end of heat exchange sub-assembly 8, and, in the embodiments shown in FIGS. 4-6, flows in a single pass in a thin film of controlled thickness therethrough. In the embodiments shown in FIGS. 7 and 8 the blood stream flows through heat exchanger sub-assembly 8 in two paths. The blood then is transfered to the gas exchanger sub-assembly by any suitable means, such as through tubing or piping (not shown) but preferably by movement into close-coupled, aligned inlet port or ports in the end of sub-assembly 10 containing the gas entrance port or ports. In preferred embodiments, the blood will be split into parallel flow in gas exchanger 10, then come together at one central manifold and exit lung/heat exchanger assembly 2 at blood outlet fitting 30, passing through blood outlet aperture 32 in cover plate 6. Details of the blood flow in gas exchanger 10 are seen more clearly in FIG. 3.

FIGS. 4-6 show in detail two constructions of heat exchanger sub-assembly 8 and illustrate single path flows. These heat exchangers use the internal pressure of blood to make membrane surface 62 conform to the heat source or heat sink, e.g., the heated or cooled surface of lung holder platen 4. In this way, a highly efficient thermal junction is obtained and the adverse effect of bows, warps and waves on the surface can be conformed to and insulating air gaps avoided. Membrane 62 can be made of nonporous metal or organic polymeric material, preferably an organopolysiloxane, a polycarbonate, a block copolymer of an organopolysiloxane and a polycarbonate, aluminum or stainless steel. Preferably it will comprise stainless steel or a polycarbonate, of about 1 to 3 mils in thickness. Membrane 62 (and 70, if used) is fastened to frame 60 with a suitable adhesive or, if thermoplastic, alternatively, by heat-sealing.

A unique interaction can be provided between heat exchanger 8 and gas exchanger 10. They may be closely coupled in one of two ways, using a solid or a floating bottom in heat exchanger 8 to confront membrane 38 and optional distribution mat 52 in gas exchanger sub-assembly 10. In FIG. 5 the heat exchanger bottom 74 is shown as a solid plastic sheet; in FIG. 6, the heat exchanger bottom closure is a floating plastic sheet 72 separating a membrane 70 bottom of the heat exchanger from the top of gas exchanger 10. A floating interface, such as is provided by the construction in FIG. 6 can move to some degree under the influence of differential pressure providing a hydraulic shim upon the gas exchanger blood envelope. This can be used to enhance the performance of the gas exchanger sub-assembly. It provides more uniform deflection (with respect to the solid base sub-assembly of FIG. 5) to ultimately provide more uniform blood film thickness in both assemblies.

Referring to FIG. 4, in operation, blood enters at inlet port 28 and spreads into a film occupying the recess under membrane 62. Passing across the recess, heat exchange can occur through the membrane, then the blood exits at ports 64 and 66.

Figures 7, 8:
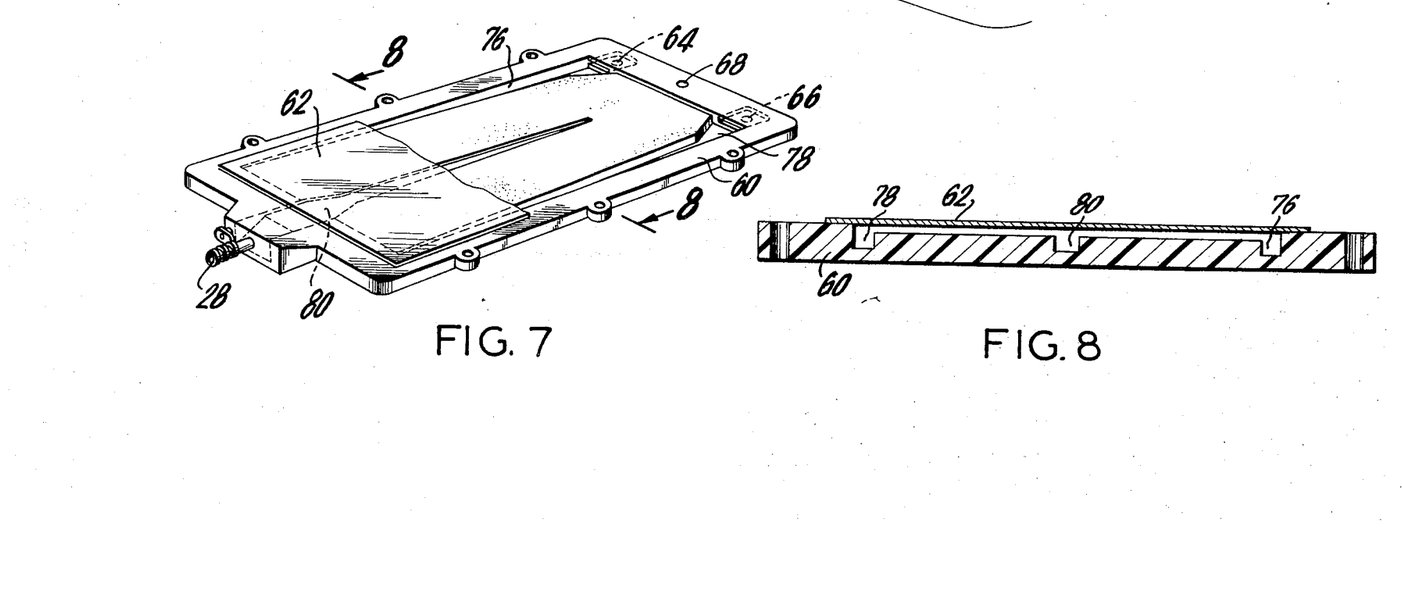
FIG. 7 is a perspective view showing another type of a heat exchanger sub-assembly according to this invention, this embodiment providing two path thin film blood flow, the membrane being partially broken away to show the internal channels.
FIG. 8 is a vertical cross-sectional view of the gas exchanger sub-assembly of FIG. 7 taken on line 8—8.

An especially preferred construction of heat exchanger assembly 8 is shown in FIGS. 7 and 8. Blood enters through inlet 28 into center tapered distribution channel 80 and then flows in two thin films (e.g., 25 mils) across two active heat transfer paths under membrane 62 to either of tapered exit channels 76 and 78. Such a two path flow has the advantage of permitting thinner blood films at the same overall pressure drop because of the shorter path distance and wider cross-sectional areas, in comparison with the embodiment of FIG. 4. Thinner films transfer heat effectively and there is no shunt down the center as is sometimes seen in the single-path heat exchanger embodiments.

Figures 2, 3, 3A, 3B:
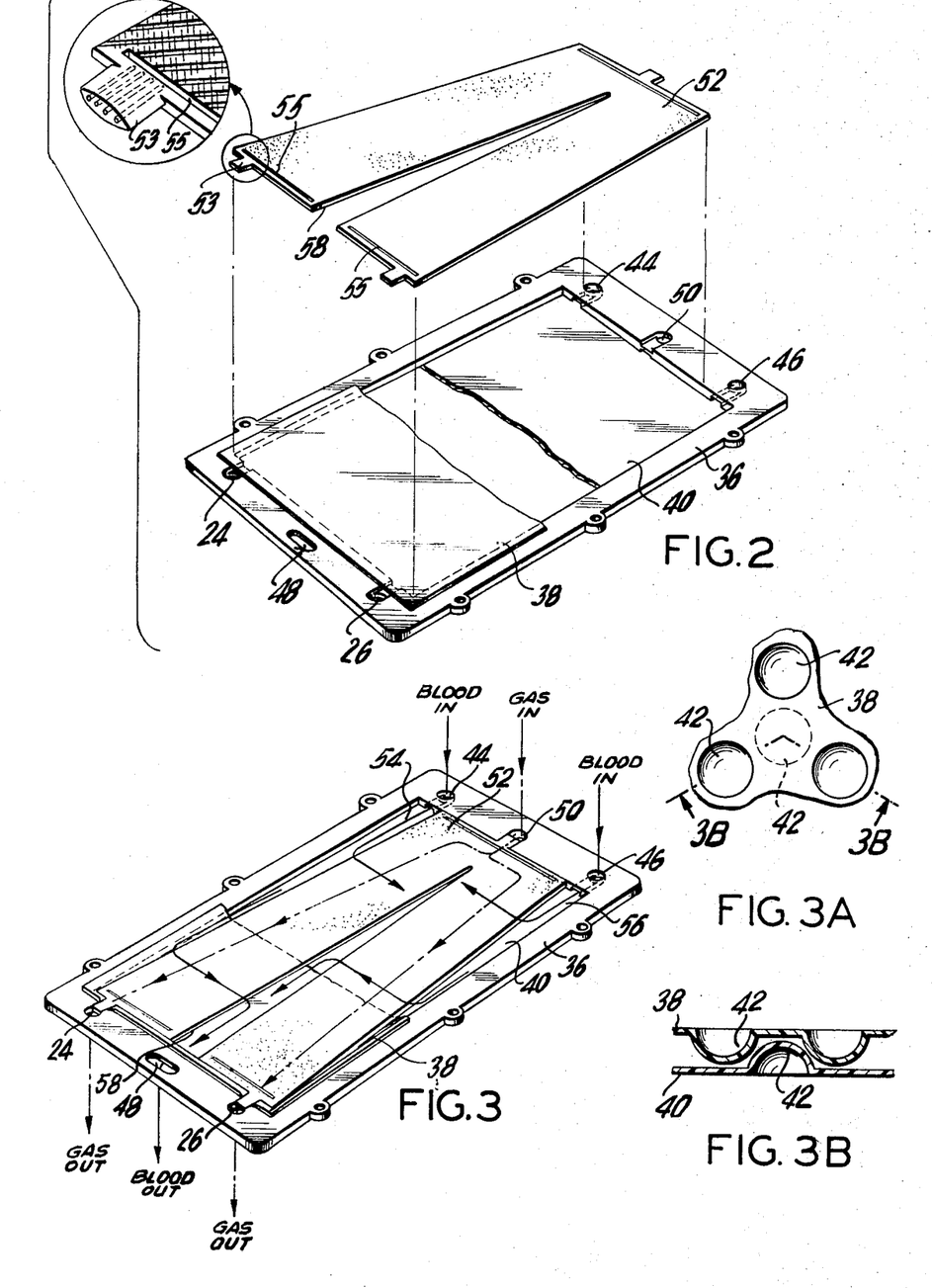
FIG. 2 is an exploded perspective view of a gas exchanger sub-assembly as used in the assembly of FIG. 1, showing the optional porous support structure.
FIG. 3 shows the sub-assembly of FIG. 2 in which the support is in place in the frame, providing a depressed gas flow recess.
FIGS. 3A and 3B are plan and cross-sectional views, respectively, showing confronting membranes with interdigitated thermoplastically formed protuberances, to facilitate blood component exchange according to preferred embodiments of the invention.

FIGS. 2 and 3 show in detail a construction of gas exchanger sub-assembly 10 and illustrates preferred flow paths. Open gas mat insert 52 is used for advantages mentioned above. The magnified view of tab 53 in FIG. 2 shows small passageways molded therein communicating with slots 55 to help distribute the gas evenly. Corresponding channels can be provided at the downstream tab. Basically, sub-assembly 10 is made up of one or more layers of frames 36 with membranes 38 and 40 superposed on either or both sides and the blood flows between confronting membranes.

Broadly, oxygenating sub-assembly 10 can comprise one or more membrane envelopes interleaved with open gas mat spacers, and can comprise the thin polytetrafluoroethylene membrane envelope/gas pervious woven plastic spacer design described by Claff, et al, in above-mentioned U.S. Pat. No. 3,060,934.

Preferably, the oxygenating sub-assembly can comprise one or more frames with confronting membranes and including a gas flow recess which includes an open fluid distribution element. Such devices are the subject matter of above-mentioned copending application Ser. No. 51,829, now U.S. Pat. No. 3,684,097 the disclosure of which is incorporated herein by reference to save unnecessary detailed description. In preferred embodiments according to that disclosure, the open membrane-supportive distribution element will have a somewhat parallelogram shape to provide, with the frame margins, triangularly shaped free spaces in communication with the blood inlet and outlet ports, into which the blood membrane envelope distends under blood pressure. This distention produces elongated blood distribution and recovery channels and facilitates transfer of the blood film smoothly across the active surface of the membrane, but only in a single path.

Most preferably, the oxygenator sub-assembly of the present invention will be of unique design, and there will be an efficient two-pathway thin film blood flow therethrough. Increased efficiency permits either higher capacity in conventionally sized unis or the design of units with less parts than required by conventional units and equivalent oxygen transfer capability.

Figure 9:
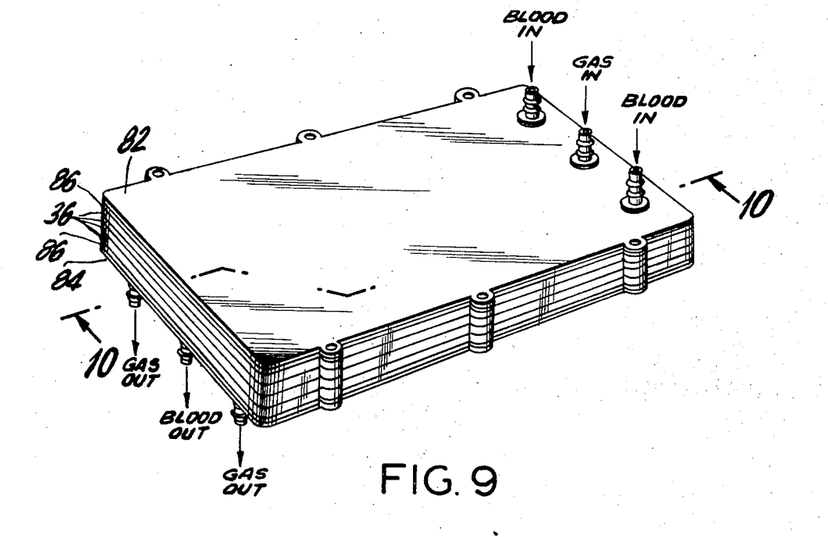
FIG. 9 is a perspective view of a blood gas exchanger (without an integral heat exchanger) according to this invention showing a sandwich of stacked gas-exchanging frames and plate and frame closure means.
Figure 10:
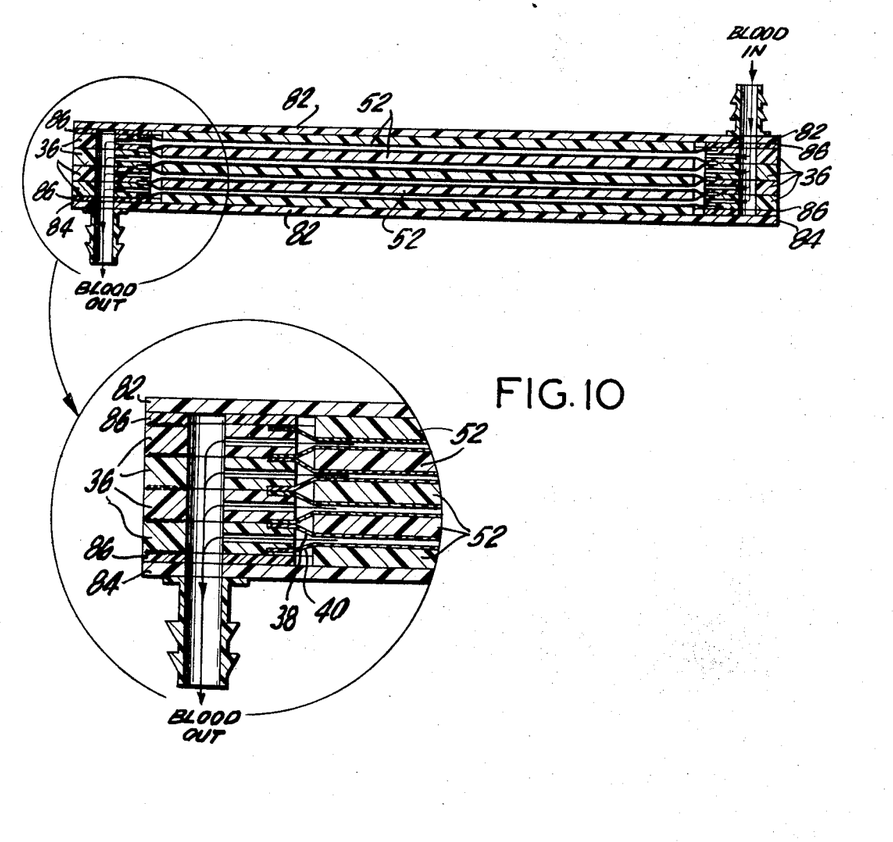
FIG. 10 is a cross-sectional view of the gas exchanger of FIG. 9 along line 10—10, showing the blood flow path through the supported membrane envelopes.

The novel gas exchanger of the present invention is shown in FIGS. 2 and 3. FIGS. 9 and 10 show four such frames in sandwich assembly. Each frame 36 comprises a plastic, such as poly(vinyl chloride) or an aromatic polycarbonate, with a central open area and superposed thereon are thin gas permeable, nonporous membranes 38 and 40. For adhesion, if desired, a suitable adhesive, such as a catalyzed epoxy cement, heat sealing, or the like may be used. The frame is perforated and channelled with blood inles 44 and 46 and blood outlet 48, gas inlet 50 and gas outlets 24 and 26. The top membrane 38 (and bottom membrane 40) is depressable into the frame to provide a gas flow recess.

As is shown in FIGS. 9 and 10, frames 36 can be stacked in sandwiches, using nonporous flat cover plates 82 and 84 and spacer frames 86 on top and bottom. For integral embodiments, cover plate 84 and spacer frame 86 can serve as bottom closures and the flat bottom of heat exchanger sub-assembly 8 can serve as the top closure for the gas exchanger sub-assembly.

In the sealed system, the membranes are depressed into the frame openings by using shaped open gas mat 52 which is substantially flat and has a thickness somewhat thinner than the thickness of frame 36. This forms a gas flow recess, and supports the membrane envelopes. Illustratively, frame 36 will be from about 40 to about 100 mils thick, with about 60 mils being preferred. In a commercial design, the external dimensions of the frames are about 11 ½ by 24 inches and the frame opening is about 10 by 22 inches. Because the membrane blood films are ordinarily of the order of about 12 mils each in thickness, the thickness of the gas distribution element will be about 48 mils, more or less, in a 60 mil thick frame. The distribution element acts as a support, and blood pressure biases the blood remote surface of the membrane against the element to provide thin film free space in the blood flow envelope. Those skilled in the art will be well aware that elements which are too thick will give rise to resistance in pumping blood through the system, while those which are too thin will cause the blood film to increase and reduce gas transfer efficiency. However, minor adjustments can easily be made in thickness using blood film thickness and pressure drop as criteria. Reference to FIG. 10 will show that there is one more gas mat than the total number of frames. This is the preferred arrangement, giving the highest gas exchange capacity for a given number of frames. If desired, however, the uppermost and/or lowermost gas mats can be omitted and the respective membranes allowed to be biased against the closure means.

The gas distribution element can be made of porous fibrous material and a suitable construction comprises a mesh core, such as a plastic screen having a mesh of 24 × 28 strands per lineal inch, inside of a sheath of non-woven fibrous material, such as poly(ethylene terephthalate) fibers which have been laid down as in a papermaking process. Such constructions are described in the above-mentioned application, Ser. No. 51,829 now U.S. Pat. No. 3,684,097. Simpler and equally suitable open distribution elements are made entirely from molded thermoplastics, without a supporting screen. One such construction involves a pattern of parallel grooves molded into the top surface and another pattern of parallel grooves in criss-cross fashion relationship molded into the bottom surface as is shown in the enlarged portion of FIG. 2.

Referring to FIGS. 2 and 3, the three-dimensional, open gas distribution element 52 is seen to be substantially flat and to have a thickness somewhat less than the thickness of frame 36. It is shaped like a trapezoid and together with the outer margins of the frame, provides two decreasingly tapered free spaces 54 and 56 beginning at blood inlet ports 44 and 46. Element 52 also includes centrally located increasingly tapered slot 58 which provides a corresponding free space increasingly tapered downstream and terminating at blood exit port 48. The free spaces provide elongated channels when the membrane envelope distends into them under the influence of blood pressure. The solid arrows in FIG. 3 show the two path flow of blood across the active, gas transport surface of the membrane and the splitting of the gas flow into two streams as is provided by this particular design is shown by broken arrows.

Any number of conventional membrane materials can be employed in component exchanger 10. For gas exchange, the membrane must be permeable to the passage of gases, such as oxygen and carbon dioxide, while remaining impermeable to blood. Typically, these will constitute rubbers, natural and synthetic, such as silicone rubbers, i.e., organopolysiloxanes, or polycarbonates, e.g., the condensation products of bisphenol-A and phosgene, block copolymers of organopolysiloxanes and polycarbonates, polytetrafluoroethylene and the like. For dialysis, the membrane must permit diffusion of blood impurities by liquid-liquid exchange, and cellophane or other conventional dialysis membranes may be used.

In accordance with this invention, blood component transfer sub-assembly 10 will include supportive elements 52 to back the membranes, and these can be embossed or grooved, and the like to provide multiple pathways when the thin membrane presses against them. However, because conventional membranes are smooth, they are inclined to adhere during storage and gas interchange is reduced.

In preferred gas exchanger embodiments, and referring to FIGS. 3A and 3B, membranes 38 and 40 are provided with thermoplastically formed protuberances 42. The thickness of the membrane in the region of each protuberance is no greater than that of the smooth areas of the membrane, and the protuberances confront each other in the blood flow envelope. These membranes are described for simplicity as having a cone field pattern which interdigitates, i.e., when confronting and closely coupled, the protuberances from one membrane fit into free spaces in the other. The advantages of using a cone-field gas membrane to prevent membrane sticking and to provide consistent thin blood films with laminar flow and no stagnant areas are described in copending application Ser. No. 67,753, filed on Aug. 28, 1970, now U.S Pat. No. 3,724,673 by one of the present apppplicants and incorporated herein by reference to avoid lengthy repetition. In general, the textured surface is created by heating, vacuum forming and cooling on a suitable die.

An ideal material for the membranes in sub-assembly 10 is an organopolysiloxane-polycarbonate block copolymer whose composition is described in U.S. Pat. No. 3,189,662 which is assigned to General Electric Company, the assignee of this application. A membrane of this type is designated by that company as MEM—213. In a device of the type disclosed herein, such a membrane has a high transfer coefficient for carbon dioxide and removes carbon dioxide approximately at the rate of 80 percent of the rate of oxygen addition. This approximates the rate of gas transfer in the human lung. The transfer coefficient of this material for oxygen is also comparatively high. A membrane made of the above-mentioned material also has the desirable property of not tearing catastrophically when it is punctured as do some of the weaker silicone membranes which have previously been used in blood oxygenators.

The components of heat exchanger/lung 2 which lie between holder 4 and plate 6 in FIG. 1 are assembled in the factory as a package. This is installed in the holder-plate combination which clamps the package to preclude blood and gas leaks and which provides oxygen and blood inlet and outlet connections. A single assembly package such as shown in FIG. 1, and having 4 gas exchanger frames is about ⅜th inch thick when stacked and compressed. A gas-exchanger of 4 frames thickness with cover plates (FIG. 9) is a little more than ¼th inch thick when stacked and compressed. In either case using the dimensions given above, an oxygenator of this type provides enough gas exchange area for localized perfusion of an organ. By stacking more and more of the oxygenator sub-assemblies, or by including more frames in each gas exchanger, e.g., 12 instead of 1–4, blood handling capacity can be attained for perfusing the whole body of an infant or an adult without fear of building up such internal pressure as to cause rupture of the membranes. Blood pressure and gas pressure drops in the oxygenator are acceptably low.

Typical performance characteristics of a 11½ × 24 inch unit show that gas transfer performance characteristics are uniformly high (60 ml. $O_2$/min. - $M^2$ and 40 ml. $CO_2$/min. - $M^2$). Heat transfer resuls are superior. The overall heat transfer coefficients were 142 Btu/hr. - $ft^2$ - °F. with a 1 mil aluminum membrane, 117 Btu/hr. - $ft^2$ - °F. with a 2 mil organopolysiloxanepolycarbonate block copolymer membrane, and 104 Btu/hr. - $ft^2$ - °F. with a 3 mil polycarbonate membrane. A 1.5 mil stainless steel membrane or a 2 mil polycarbonate membrane provide equally efficient heat transfer.

Although the various components of the new blood heat and component transfer and blood gas exchanging devices have been described in considerable detail, it is to be understood that such description is intended to be illustrative rather than limiting, for the invention may be variously modified and is to be limited in scope only by interpretation of the claims which follow.

We claim:
1. A membrane type blood heat exchange and component transfer device comprising
   a. a heat exchanger sub-assembly including
      i. a substantially planar frame having an open central area closed at the bottom with a thin membrane in combination with a floating sheet-like element disposed within the frame opening,
      ii. blood inlet means at one end of said frame in open communication with said central area,
      iii. blood outlet means at the other end of said frame in open communication with said central area,
      iv. a thin membrane adhered to the top surface of said frame to close said central area and define with said blood inlet and blood outlet means a blood heat exchange thin film flow chamber and b. a blood component exchanger sub-assembly including
      i. at least one substantially planar frame having a central open area,
      ii. blood inlet means at one end of each blood component exchanger frame in open communication with said central area,
      iii. blood outlet means at the other end of each blood component exchanger frame in open communication with said central open area,
      iv. thin membranes superposed respectively on the top and the bottom surfaces of each blood component exchanger frame and forming with said blood inlet and outlet means a blood flow envelope, the blood remote surface of one or both said membranes constituting the top or bottom of a depressable fluid flow recess in each blood component exchanger frame,
      v. fluid inlet means at one end of each blood component exchanger frame in open communication with said fluid flow recess, when depressed,
      vi. fluid outlet means at the other end of each blood component exchanger frame in open communication with said fluid flow recess, when depressed,
      vii. closure means superposed on one or both surfaces of each blood component exchanger frame to define with the blood remote surface or surfaces of said membrane or membranes, the fluid inlet means, and the fluid outlet means, a blood component exchange fluid flow chamber, the blood remote surface of one or both said membranes constituting the top or bottom of said chamber and
      viii. a fluid distribution element in at least one said fluid flow chamber, said element being substantially flat, membrane-supportive and open to the passage of fluid and
   c. means to transfer the blood between said exchangers.

2. A device as defined in claim 1 wherein the means to transfer the blood comprises a stacked assembly consisting of the heat exchanger and the blood component exchanger, the blood outlet from one exchanger being aligned and close-coupled with the blood inlet to the other exchanger.

3. A device as defined in claim 1 wherein the thin membrane adhered to the top surface of the heat exchanger frame is comprised of metal or an organic polymeric material.

4. A device as defined in claim 3 wherein said membrane comprises an organopolysiloxane, a polycarbonate, a block copolymer of an organopolysiloxane and a polycarbonate, aluminum or stainless steel.

5. A device as defined in claim 1 wherein the thin membranes superposed on each blood component exchanger frame have a myriad of protuberances permanently formed in them in which the thickness of the membrane in the region of each protuberance is no greater than that of the smooth areas of the membrane, and the protuberances confront each other in said blood flow envelope.

6. A device as defined in claim 1 wherein the thin membranes superposed on each said blood component exchanger frame comprise an organopolysiloxane, a polycarbonate or a block copolymer of an organopolysiloxane and a polycarbonate.

7. A device as defined in claim 1 wherein each said fluid distribution element includes fluid flow channels on its opposed major planar surfaces.

8. A device as defined in claim 1 wherein the fluid flow recess, the fluid inlet means, the fluid flow outlet means, the blood component exchange fluid flow chamber and the fluid distribution element are, respectively, a gas flow recess, a gas inlet means, a gas outlet means, a blood component exchange gas flow chamber and a gas distribution element.

9. A device as defined in claim 8 wherein each said gas distribution element includes gas flow channels on is opposed major planar surfaces.

10. A device as defined in claim 1 wherein the closure means for at least one surface of a blood component exchanger frame, defining therewith said blood component exchange fluid flow chamber, is the bottom surface of said heat exchanger.

11. A device as defined in claim 1 wherein the blood-remote surface of the membrane adhered to the top surface of the heat exchanger is in close, substantial contact with the surface of a heat source or a heat sink.

12. A device as defined in claim 1 including a plurality of blood component exchanger frames, blood flow envelopes, fluid flow recesses and fluid distribution elements, in stacked assembly.

13. A membrane type blood heat and gas exchange device comprising
  a. a heat exchanger sub-assembly including
    i. a plate with a central recess open at the top,
    ii. a blood inlet port centrally located at one end of said plate in open communication with said recess and terminating in a decreasingly tapered longitudinal entrance channel centrally located in the bottom of said recess,
    iii. two blood outlet ports at the other end of said plate in open communication with said recess and beginning in increasingly tapered longitudinal exit channels in the bottom of said recess along the opposite margins thereof, the inlet and outlet channels being spaced to provide for splitting the blood flow into two pathways, and
    iv. a thin membrane adhered to the top surface of said plate to close said recess and define with the blood inlet port, the blood outlet ports and the respective channels, a two-path blood heat exchange thin film flow chamber and
  b. a blood gas exchanger sub-assembly including
    i. at least one substantially planar frame having a central open area,
    ii. a pair of blood inlet ports at one end of each blood gas exchanger frame in open communication with said central area,
    iii. a blood outlet port at the other end of each blood gas exchanger frame in open communication with said central open area,
    iv. thin membranes having a myriad of protuberances permanently formed in them in which the thickness of the membrane in the region of each protuberance is no greater than that of the smooth areas of the membranes, said membranes being superposed respectively on the top and bottom surfaces of each blood gas exchanger frame, the protuberances confronting each other, the membranes forming with the blood inlet and outlet ports a blood flow envelope, the blood remote surface of each membrane constituting the bottom or top of a depressable gas flow recess in each blood gas exchanger frame,
    v. a gas inlet port at one end of each blood gas exchanger frame in open communication with said gas flow recess, when depressed,
    vi. a pair of gas outlet ports at the other end of each blood gas exchanger frame in open communication with said gas flow recess, when depressed,
    viii. a gas distribution element on the blood remote surface of each said membrane, said element being substantially flat, membrane-supportive, including gas flow channels on its opposed major planar surfaces and having a thickness somewhat less than the frame thickness, and being shaped like a trapezoid to provide with the outer margins of each said frame two decreasingly tapered channels which begin at the blood inlet ports and including a centrally located increasingly tapered channel terminating at the blood exit port, said channels providing free spaces into which the membrane envelope can distend with limits to effect a pair of elongated blood channels beginning at the blood entrance ports and an elongated blood channel beginning within the gas exchanger and terminating at the blood exit port, when the space between the membranes is under blood pressure, whereby the blood is passed across the gas exchange membrane in two thin film pathways, and
    viii. closure means comprising the bottom of said heat exchanger superposed on the top surface of the uppermost said element, depressing said element and the top membrane of the gas exchanger into the recess of the uppermost gas exchanger frame to define with the blood remote surface of said membrane, the gas inlet port, and the gas outlet ports a blood gas flow chamber whose depth is equal to the element thickness and to compress said blood flow envelope to provide a relatively thin film space between the confronting membranes, the heat exchanger and the gas exchanger being in stacked relationship, the blood outlet ports of the heat exchanger being aligned and close-coupled with the blood inlet ports of the gas exchanger.

14. A device as defined in claim 13 wherein the thin membrane superposed on the top surface of the heat exchanger plate is comprised of a metal or an organic polymeric material.

15. A device as defined in claim 14 wherein the membrane comprises stainless steel or a polycarbonate.

16. A device as defined in claim 13 wherein the membranes adhered to each said gas exchanger frame comprise an organopolysiloxane, a polycarbonate or a block copolymer of an organopolysiloxane and a polycarbonate.

17. A device as defined in claim 13 wherein the blood remote surface of the heat exchanger membrane is in close, substantial contact with the surface of a heat source or a heat sink.

18. A device as defined in claim 13 including bottom closure means comprising a plate and spacer superposed on the bottom surface of the lowermost said element, depressing said element and the bottom member of the gas exchanger into the bottommost gas exchanger frame to provide a corresponding blood gas flow chamber.

19. A device as defined in claim 13 including a plurality of blood gas exchanger frames, blood flow envelopes, gas flow recesses and gas distribution elements, in stacked assembly.

20. A two flow path, membrane blood gas exchanger comprising
  i. at least one substantially planar frame having a central open area,
  ii. a pair of blood inlet ports at one end of each blood gas exchanger frame in open communication with said central area,
  iii. a blood outlet port at the other end of each said frame in open communication with said central open area,
  iv. thin membranes having a myriad of protuberances permanently formed in them in which the thickness of the membrane in the region of each protuberance is no greater than that of the smooth areas of the membranes, said membranes being superposed respectively on the top and bottom surfaces of each blood gas exchanger frame, the protuberances confronting each other, the membranes forming with the blood inlet and outlet ports a blood flow envelope, the blood remote surface of each membrane constituting the bottom or top of a depressable gas flow recess in each frame,
  v. a gas inlet port at one end of each blood gas exchanger frame in open communication with said gas flow recess, when depressed,
  vi. a pair of gas outlet ports at the other end of each blood gas exchanger frame in open communication with said gas flow recess, when depressed,
  vii. a gas distribution element on the blood remote surface of each said membrane, said element being substantially flat, membrane-supportive and open to gas flow and having a thickness somewhat less than the frame thickness, and being shaped like a trapezoid to provide with the outer margins of each said frame two decreasingly tapered channels which begin at the blood inlet ports and including a centrally located increasingly tapered channel terminating at the blood exit port, said channels providing free spaces into which the membrane envelope can distend with limits to effect a pair of elongated blood channels beginning at the blood entrance ports and an elongated blood channel beginning within the gas exchanger and terminating at the blood exit port, when the space between the membranes is under blood pressure, whereby the blood is passed across the gas exchange membrane in two thin film pathways, and
  viii. closure means comprising a plate and spacer superposed on the top surface of the uppermost said element, depressing said element and the top membrane of the gas exchanger into the recess of the uppermost gas exchanger frame to define with the blood remote surface of said membrane, the gas inlet port, and the gas outlet ports a blood gas flow chamber whose depth is equal to the element thickness and to compress said blood flow envelope to provide a relatively thin film space between the confronting membranes.

21. A device as defined in claim 20 wherein the membranes adhered to each said gas exchanger frame comprise an organopolysiloxane, a polycarbonate or a block copolymer of an organopolysiloxane and a polycarbonate.

22. A device as defined in claim 20 including bottom closure means comprising a plate and spacer superposed on the bottom surface of the lowermost said element, depressing said element and the bottom membrane of the gas exchanger into the bottommost gas exchanger frame to provide a corresponding blood gas flow chamber.

23. A device as defined in claim 20 wherein said gas distribution element includes gas flow channels on its opposed major planar surfaces.

24. A device as defined in claim 20 including a plurality of blood gas exchanger frames, blood flow envelopes, gas flow recesses and gas distribution elements, in stacked assembly.

* * * * *